United States Patent
Xiang et al.

(10) Patent No.: US 8,053,394 B2
(45) Date of Patent: *Nov. 8, 2011

(54) DRILLING FLUIDS WITH REDISPERSIBLE POLYMER POWDERS

(75) Inventors: Tao Xiang, Cypress, TX (US); Dennis K. Clapper, Houston, TX (US); Donald C. Krause, Spring, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/707,830

(22) Filed: Feb. 18, 2010

(65) Prior Publication Data

US 2010/0210481 A1 Aug. 19, 2010

Related U.S. Application Data

(63) Continuation-in-part of application No. 11/437,351, filed on May 19, 2006, now abandoned, which is a continuation-in-part of application No. 10/656,047, filed on Sep. 5, 2003, now Pat. No. 7,271,131, and a continuation-in-part of application No. 10/634,334, filed on Aug. 4, 2003, now Pat. No. 7,393,813, which is a continuation-in-part of application No. 09/785,842, filed on Feb. 16, 2001, now Pat. No. 6,703,351.

(60) Provisional application No. 60/211,162, filed on Jun. 13, 2000.

(51) Int. Cl.
C09K 8/12 (2006.01)
E21B 33/10 (2006.01)

(52) U.S. Cl. ......... 507/118; 166/305.1; 175/65; 175/72; 507/117; 516/20; 516/31; 516/77

(58) Field of Classification Search .................. 507/118, 507/117; 166/305.1; 175/65, 72; 516/77, 516/20, 31
See application file for complete search history.

(56) References Cited

U.S. PATENT DOCUMENTS

| | | | |
|---|---|---|---|
| 2,809,179 A | 10/1957 | Endres | |
| 3,593,794 A | 7/1971 | Fischer et al. | |
| 3,717,204 A | 2/1973 | Scheffel et al. | |
| 3,724,547 A | 4/1973 | Bott | |
| 3,730,271 A | 5/1973 | Gall | |
| 3,780,806 A | 12/1973 | Bott | |
| 4,436,636 A | 3/1984 | Carnicom | |
| 4,537,918 A | 8/1985 | Parcevaux et al. | |
| 4,671,883 A | 6/1987 | Connell et al. | |
| 4,740,319 A | 4/1988 | Patel et al. | |
| 5,164,433 A | 11/1992 | Ricci et al. | |
| 5,346,011 A | 9/1994 | Onan et al. | |
| 5,913,364 A | 6/1999 | Sweatman | |
| 6,167,967 B1 | 1/2001 | Sweatman | |
| 6,234,251 B1 | 5/2001 | Chatterji et al. | |
| 6,328,106 B1 | 12/2001 | Griffith et al. | |
| 6,401,817 B1 | 6/2002 | Griffith et al. | |
| 6,508,306 B1 | 1/2003 | Reddy et al. | |
| 6,703,351 B2 | 3/2004 | Stowe, II et al. | |
| 6,881,708 B2 | 4/2005 | Reddy et al. | |
| 7,271,131 B2 | 9/2007 | Halliday et al. | |
| 7,393,813 B2 | 7/2008 | Halliday et al. | |
| 2002/0160919 A1 | 10/2002 | Stowe et al. | |
| 2004/0110644 A1 | 6/2004 | Halliday et al. | |
| 2004/0132625 A1 | 7/2004 | Halliday et al. | |
| 2006/0116294 A1 | 6/2006 | Xiang et al. | |

FOREIGN PATENT DOCUMENTS

| | | |
|---|---|---|
| EP | 0175412 A2 | 3/1986 |
| GB | 2074636 A | 11/1981 |
| GB | 2131067 A | 6/1984 |
| GB | 2304754 A | 3/1997 |
| GB | 2351986 A | 1/2001 |
| WO | 9309201 A1 | 5/1993 |

OTHER PUBLICATIONS

C. Stowe, et al., "Laboratory Pore Pressure Transmission Testing of Shale," AADE National Drilling Technical Conference, 2001, pp. 1-10, AADE 01-NC-HO-44.
American Chemical Society, CAS Registry No. 9070-52-5, "Copolymer Vinyl Acetate-Vinyl Versatate," 2003, pp. 1-2.
Dow Chemical Company, "DLP 110 Redispersible Polymer Powder," Dec. 1, 2003, p. 1.
Dow Chemical Company, "DLP 2020 Redispersible Polymer Powder," Jan. 2004, p. 1.
Celanese, "Flexible Connections: Mowilith/Celvolit Powder as Additive or Sole Binder," Mar. 2005, pp. 1-8.
A. Fonze, et al., "Acrylate Ester of Glycidyl Versatate: Reactive Diluent for Laminating and PSA UV Formulations," RadTech 2005 Conference & Exhibition, pp. 1-6.
Mallard Creek Polymers, "Redispersible Latex Powders DA-1120" [no date].
Mallard Creek Polymers, "Material Safety Data Sheet: DA-1120 Poly(ethylene-co-vinyl acetate) Redispersible latex Powder" [no date].
Mallard Creek Polymers, "Redispersible Latex Powders DA-1410" [no date].
Mallard Creek Polymers, "Material Safety Data Sheet: DA-1410 Poly(ethylene-co-vinyl acetate) Redispersible Latex Powder" [no date].
Mallard Creek Polymers. "Redispersible Latex Powders DA-2300" [no date].
Mallard Creek Polymers. "Material Safety Data Sheet: DA-2300 Poly (ethylene~o-vinyl acetate) Redispersible Latex Powder" [no date].

*Primary Examiner* — Timothy J. Kugel
(74) *Attorney, Agent, or Firm* — Mossman Kumar & Tyler PC

(57) ABSTRACT

A drilling fluid has a redispersible polymer powder introduced as a water dispersion that is capable of providing a deformable latex film on at least a portion of a subterranean sand formation and which inhibits or controls fluid loss and acts as a sealing agent when used to drill in sand formations for hydrocarbon recovery operations. The redispersible polymer powder may be made by drying the emulsion in which they are formed and then grinding into a powder or by spray drying. The polymer particles of suitable size precipitate or collect or assemble onto the pores of a subterranean sand formation to at least partial seal the formation with a deformable polymer film.

11 Claims, 1 Drawing Sheet

DRILLING FLUIDS WITH REDISPERSIBLE POLYMER POWDERS

CROSS-REFERENCE TO RELATED APPLICATIONS

This application is a continuation-in-part of U.S. patent application Ser. No. 11/437,351 filed May 19, 2006, abandoned, which is a continuation-in-part of U.S. patent application Ser. No. 10/634,334 filed on Aug. 4, 2003, issued Jul. 1, 2008 as U.S. Pat. No. 7,393,813, and U.S. patent application Ser. No. 10/656,047 filed on Sep. 5, 2003, issued Sep. 18, 2007 as U.S. Pat. No. 7,271,131 both of which are continuation-in-parts of U.S. patent application Ser. No. 09/785,842 filed Feb. 16, 2001, issued Mar. 9, 2004 as U.S. Pat. No. 6,703,351 which in turn claims the benefit of U.S. Provisional Application No. 60/211,162 filed Jun. 13, 2000.

TECHNICAL FIELD

The present invention relates to drilling fluids used during petroleum recovery operations, and more particularly relates, in one embodiment, to using oil-based or water-based drilling fluids containing redispersible additives to inhibit fluid loss in the drilling of depleted sand formations.

BACKGROUND

Drilling fluids used in the drilling of subterranean oil and gas wells as well as other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that herein, the term "drilling fluid" also encompasses "drill-in fluids".

Drilling fluids are typically classified according to their base material. In water-based muds, solid particles are suspended in water or brine. Oil can be emulsified in the water or brine. Nonetheless, the water is the continuous phase. Oil-based muds are the opposite. Solid particles are suspended in oil and water or brine is emulsified in the oil and therefore the oil is the continuous phase. Oil-based muds that are water-in-oil emulsions are also called invert emulsions. Brine-based drilling fluids, of course are a water-based mud in which the aqueous component is brine.

Optimizing high performance water-base mud design is commonly at the forefront of many drilling fluid service and oil operating companies' needs due to the various limitations of invert emulsion fluids. Invert emulsion fluids formulated with traditional diesel, mineral or the newer synthetic oils are the highest performing drilling fluids with regard to shale inhibition, borehole stability, and lubricity. Various limitations of these fluids, however, such as environmental concerns, economics, lost circulation tendencies, kick detection, and geologic evaluation concerns maintains a strong market for high performance water-based fluids. Increased environmental concerns and liabilities continue to create an industry need for water-based drilling fluids to supplement or replace the performance leading invert emulsion mud performance.

A particular problem when drilling into shale formations with drilling muds or fluids is the pore pressure increase and shale swelling from the penetration of the shale by the fluid. Shale stabilizers are typically added to the mud to inhibit these phenomena and to stabilize the shale from being affected by the mud.

Reducing drilling fluid pressure invasion into the wall of a borehole is one of the most important factors in maintaining wellbore stability. It is recognized that sufficient borehole pressure will stabilize shales to maintain the integrity of the borehole. When mud or liquid invades the shale, the pressure in the pores rises and the pressure differential between the mud column and the shale falls. With the drop in differential pressure, the shale is no longer supported and can easily break off and fall into the well bore. Likewise, the invasion of water into the shale matrix increases hydration or wetting of the partially dehydrated shale body causing it to soften and to lose its structural strength. Chemical reactivity can also lead to instability. There is always a need for a better composition and method to stabilize the shale formations.

There is an analogous need to seal and prevent fluid loss control when recovering hydrocarbons from sand formations, particularly in depleted sand formations. Depleted sand formations are productive, or formerly productive, hydrocarbon zones that have been produced, drawn down, or otherwise depleted of their content, creating a lower formation pressure than that of the fluid which may be in use in the well. Because of this pressure differential, it is important to partially or completely seal the sand formation to inhibit or prevent fluid loss of the mud into the sand.

U.S. Pat. No. 6,703,351 to Stowe, et al. (Baker Hughes Incorporated) involves a water-based drilling fluid having a polymer latex capable of providing a deformable latex film on at least a portion of a subterranean formation. This was discovered to provide reduced drilling fluid pressure invasion when used to drill in shale formations for hydrocarbon recovery operations. A precipitating agent such as a silicate or an aluminum complex (e.g. sodium aluminate) is preferably used in conjunction with the polymer. Typically, the water present contains a salt to form a brine, often to saturation, although the invention may be practiced with fresh water. If a salt is employed, it is often helpful to additionally employ a surfactant, such as a betaine, for example.

It is apparent to those selecting or using a drilling fluid for oil and/or gas exploration that an essential component of a selected fluid is that it be properly balanced to achieve all of the necessary characteristics for the specific end application. Because the drilling fluids are called upon to do a number of tasks simultaneously, this delicate balance is difficult to achieve.

It would be desirable if compositions and methods could be devised to aid and improve the ability of drilling fluids to simultaneously accomplish these tasks.

SUMMARY

There is provided, in one non-limiting embodiment a method of inhibiting fluid loss of a drilling fluid in a subterranean formation. The method involves providing a drilling fluid that contains a base fluid that may be either a hydrocarbon base fluid or an aqueous base fluid. A redispersible polymer powder is dispersed in the fluid, where the powder is added to the base fluid in a water dispersion or alternatively added directly to the base fluid. The drilling fluid has an absence of an added paraffin wax. The drilling fluid is circulated in contact with the subterranean formation. A deformable seal of redispersible polymer is formed at least partially in contact with the subterranean formation.

In another non-restrictive version of the invention, there is provided, in one form, a drilling fluid that contains a base fluid that is either a hydrocarbon base fluid or an aqueous base fluid, and a redispersible polymer powder dispersed in the fluid, where the powder is added in a water dispersion or alternatively is added directly to the base fluid. Again, the drilling fluid has an absence of an added paraffin wax.

DETAILED DESCRIPTION

Figure 1:
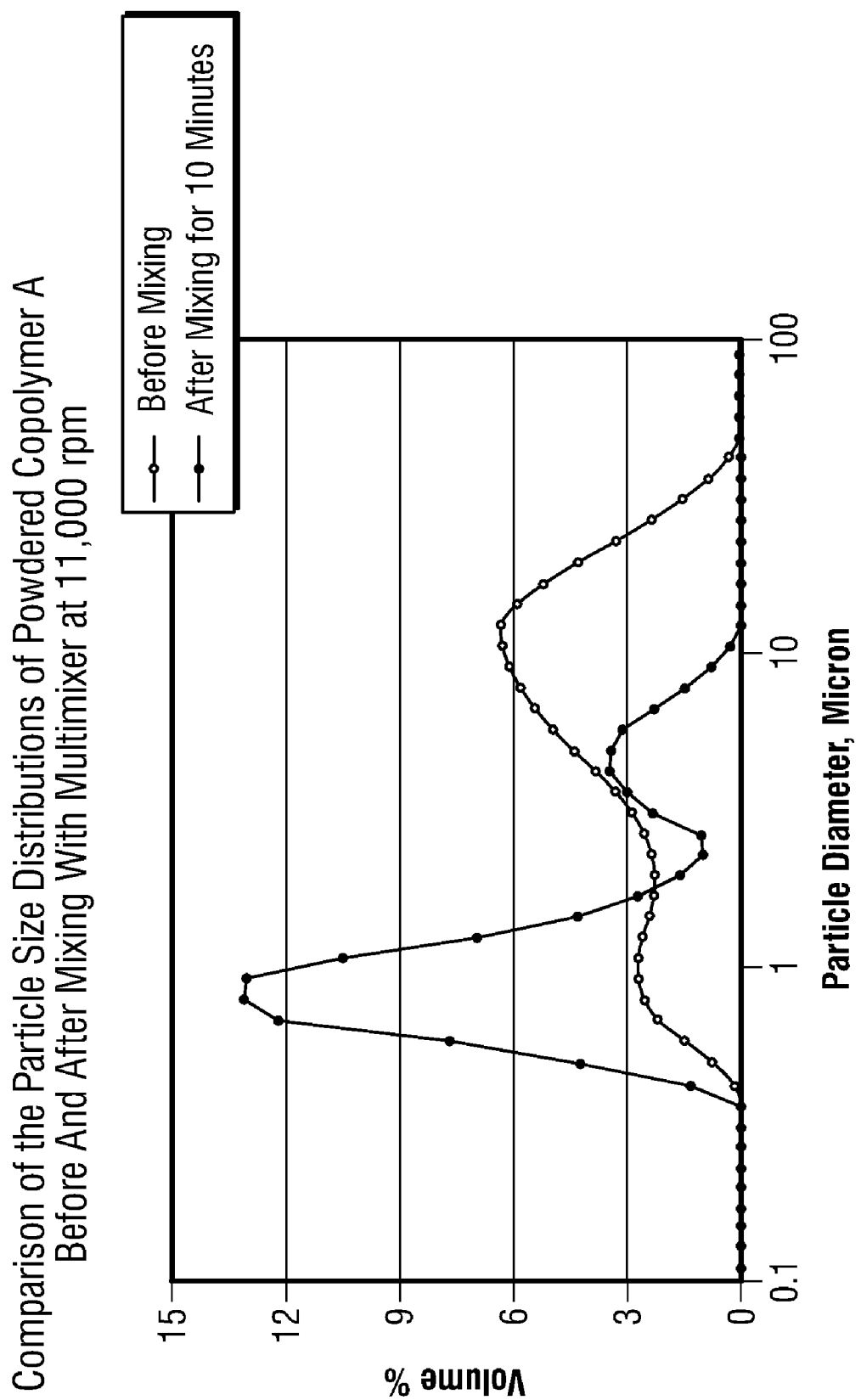
FIG. 1 is a graph comparing the particle size distributions of powdered particles of Copolymer A before and after mixing with a Multimixer at 11,000 rpm, presenting percent volume as a function of particle diameter in microns.

It has been discovered that the particles in a redispersible polymer powder dispersion added to a water-based or an oil-based drilling fluid may reduce the rate that the drilling fluid pressure invades the borehole wall of a subterranean formation during drilling. The redispersible polymer powder dispersion in one non-limiting embodiment is capable of providing a deformable film or seal on at least a portion of a subterranean formation.

It has been additionally discovered that the redispersible polymer powders of this invention can be incorporated into oil-based drilling fluids. However, it has been discovered that in these fluids, the polymer seals can be formed without the need for a precipitating agent, a surfactant or any salt in the water phase. The dispersion, where generally water or other aqueous component is the continuous phase, may in turn suspended in a hydrocarbon base fluid having at least an amount of optional emulsifier sufficient to suspend the dispersion therein. In one non-limiting embodiment of the invention, the dispersion containing the redispersible polymer powder may simply be mixed with the hydrocarbon base fluid without the need for adding any more emulsifier than is normally present in such fluids.

It has been further discovered that certain powders or particles formed by latex emulsion polymerization are redispersible. Most latexes are liquid water suspensions or dispersions with colloid-sized particles. However, after the latexes are dried or in the methods herein form a seal or film, they will become a solid rubber-like or elastomer polymer and cannot be subsequently redispersed in water further. In one non-limiting embodiment, some of the redispersible polymer powders employed in the methods and compositions herein are ground or size-reduced dried, solid copolymers. In another, alternative, non-restrictive embodiment, the emulsion polymer latex is spray dried by atomizing into fine drops, such as in a spray tower. At the same time, heated air is blown through the tower, quickly drying the emulsion and causing the individual particles to combine and form powders. Optionally, an anti-caking agent or anti-agglomerating agent is added to the tower to prevent or inhibit caking or agglomerating of the powder during storage.

These kinds of redispersible polymer powders may be redispersed in water forming a stable dispersion again. Different from regular liquid latex suspensions, these redispersible polymer powders have no freezing problem when used in winter or other freezing or sub-freezing conditions since as a dry powder before being formed into a suspension there is no liquid. The redispersible polymer particles herein may be made by latex emulsion polymerization and subsequently processed as previously described, but they are not liquid latexes when implemented. That is, the present method and compositions are implemented in the absence of a latex. The redispersible polymer powders are 100% active, whereas conventional liquid latex is about 50% polymer and 50% water. Transportation and handling of the redispersible polymer powders is thus easier because a liquid is not involved. Redispersible polymer powders are also more economical to transport and handle because there is considerably less inert material, i.e. water.

The components of the water-based drilling fluids of this invention are an aqueous base fluid (the majority of which is water) and the redispersible polymer powder, which is added, introduced or mixed into the aqueous base fluid as a dispersion. The aqueous base fluid makes up the bulk of the drilling fluid. In the case of oil-based fluids, there is a considerable proportion of oil as well. Of course, a number of other common and/or conventional drilling fluid additives may be employed as well to help balance the properties and tasks of the fluid.

There are many kinds of polymers that may be used to provide temporary or permanent seals or films in subterranean formations. However, there are only a relatively smaller group of polymers that are redispersible. Suitable examples of polymers redispersible in powder form include, but are not necessarily limited to, poly(ethylene-vinyl acetate), poly(ethylene-vinyl versatate), poly(ethylene-vinyl acetate-vinyl chloride), poly(styrene-butadiene), poly(carboxylated styrene-butadiene), poly(sulfonated styrene-butadiene), and combinations thereof. The nomenclature of the term "versatate" is somewhat confused as it seems to derive from "versatic" acid with is also identified in the literature as a trademark VERSATIC™ Acid. A common poly(ethylene-vinyl versatate) is poly(ethylene-vinyl tert-decanoate), where the non-ethylene monomer is the vinyl ester of decanoic acid. Suitable monomers include, but are not necessarily limited to the vinyl ester of dodecanoic acid. Herein, a generic term for these polymers is poly(ethylene-vinyl tert-alkanoate), the tert-alkyl group may have linear or branched alkyl groups having a total of from about 6 to about 16 carbon atoms.

Commercially available redispersible polymer powders may contain a dispersant. During the production of these powders, which involve emulsion polymerization as previously noted, so-called protective colloids may be used in order to ensure sufficient colloidal stabilization of the emulsion. Thus, water-soluble polymers including, but not necessarily limited to poly(vinyl alcohol) and cellulose ethers may be added at the onset of or during the polymerization process. These polymers may remain upon the drying of the latex to the solid, as well as the grinding or other size reduction process to fine particles or powders which are then formed into aqueous liquid dispersions.

In one non-limiting embodiment, poly(ethylene-vinyl acetate) powder or particles have been found to be a redispersible polymer powders for water-based fluids. In a different non-restrictive version poly(ethylene-co-vinyl versatates) (also termed poly(ethylene-vinyl tert-alkanoates) herein) powder or particles has been found to be a redispersible for oil-based fluids. It is expected that few, if any, polymers would effectively function for both water-based fluids and oil-based fluids.

The particle sizes of the redispersible polymer powder may be less than 100 micron in one non-limiting embodiment herein, and in another non-restrictive version have a diameter of about 0.2 microns or greater. In an alternate non-restrictive version, the lower threshold is about 0.5 microns or greater, and independently the upper threshold is about 80 microns or less. In another non-limiting embodiment, the upper threshold is about 50 microns or less, and alternatively about 25 microns or less. These ranges overlap the colloid size range which may be understood to be between 1 millimicron (nanometer) and 1 micron (micro-meter). It is anticipated that more than one type of redispersible polymer powder may be used simultaneously.

In many non-limiting embodiments the redispersible polymer powder is added into mud system directly. In a different, non-restrictive method, if a dispersion is made with water or some other latex products first and then added into the mud system, the total latex and polymer particle concentration may range from about 20 to about 60 vol %, based on the dispersion. That is, in an optional embodiment, the aqueous dispersion may contain the redispersible polymer powders and optionally also a latex.

Other polymers in the dispersed phase may be found to work together with those of the instant compositions and methods. In one non-limiting instance, any of the polymers of U.S. Pat. No. 6,703,351; U.S. Patent Application Nos. 2004/0110644 and 2004/0132625, incorporated herein by reference in their entirety may be used together with the redispersible polymer powders discussed herein. Other polymers useful in the disperse phase along with the redispersible polymer powders herein may have a different size, in one non-limiting example of from about 0.1 to about 0.2 microns, alternatively the particle size may range from about 0.8 to 1.2 microns. Examples of other polymers that may be used include, but are not limited to MAX-SHIELD sealing polymers available from Baker Hughes Drilling Fluids. Of course, it may be understood that which particle size or combination of particle sizes that works best will depend on the pore size of the sand formation being treated. The redispersible polymer powders herein may also be used together with non-deformable particles to advantage as well. It is expected that the use of two or more products together may work better in some applications than one product used alone. Suitable non-deformable particles include, but are not necessarily limited to, MIL-CARB® sized carbonate bridging material available from Baker Hughes Drilling Fluids.

The redispersible particles in dry powder form described above are considered to be 100% active, and thus there is no handling or transportation of inert material. Further, the redispersible polymer powders herein do not have a problem with freezing at low temperatures compared with conventional liquid latex suspensions.

In the water-based drilling fluids the optional salt may be any common salt used in brine-based (aqueous) drilling fluids, including, but not necessarily limited to calcium chloride, sodium chloride, potassium chloride, magnesium chloride, calcium bromide, sodium bromide, potassium bromide, calcium nitrate, sodium formate, potassium formate, cesium formate and mixtures thereof. By a "high salt content" is meant at least 20 weight percent, and saturated brine solutions are preferred in one non-limiting embodiment. It will appreciated that it is impossible to predict in advance what the salt content of a particular saturated brine solution will be since the saturation point depends on a number of factors including, but not limited to the kinds and proportions of the various components of the water-based fluid. The salt is optional because the invention will perform without it, that is, using fresh water.

Another optional component of the composition of the invention is a surfactant that may help the redispersible polymer powders be dispersed in the water dispersion. If the surfactant is present, the surfactant treated powder may wet the surface strongly and accumulate to form a seal, film or coating that seals fractures and defects in the shale. Suitable wetting surfactants include, but are not limited to, betaines, alkali metal alkylene acetates, sultaines, ether carboxylates, and mixtures thereof. It has been determined that surfactants are particularly beneficial when salts are present in the drilling fluid, and are not as preferred or useful in fresh water fluid systems.

The proportions of these components based on the total drilling fluid in one non-limiting embodiment may be from about 0.1 to 5 volume % of redispersible polymer from the powder, at least 1 wt % of salt (if present), from about 0.005 to about 2 vol.% of surfactant (if present), the balance being water or oil (depending on whether it is a water-based fluid or an oil-based fluid). In an alternate, non-restrictive embodiment, the proportions range from about 0.5 to 3 vol.% of redispersible polymer, at least 1 wt % of salt (if present), and from about 0.01 to about 1.75 vol. % of wetting surfactant (if present), the balance being water (or oil).

In practice, the dry redispersible polymer powder can be directly introduced into drilling fluid. The dry redispersible polymer powder can also be mixed and combined thoroughly with water or other latex products (liquid), often at high speed and/or shear to form a stable dispersion. The polymer dispersion is in turn added to the drilling fluid.

In another embodiment herein, the redispersible polymer particles are dispersed in a hydrocarbon base fluid, also known as an oil-based fluid. The hydrocarbon phase may be any suitable hydrocarbon used in drilling fluid applications including, but not necessarily limited to diesel, synthetic hydrocarbons, such as isomerized polyolefins and the like. Hydrocarbon base fluids used as drilling muds typically contain emulsifiers that are necessary to achieve the multiple functions of the mud. These emulsifiers are all suitable to suspend the redispersible polymer particles in the hydrocarbon base fluid. The solid particles are dispersed as "particles" in the hydrocarbon base fluid phase. The size of these particles may be larger than the size of the dry redispersible polymer powder and may range up to 500 microns in one non-limiting embodiment of the fluids herein, and from about 10 to about 100 or less than 100 microns in an alternate embodiment. In another non-limiting, alternate embodiment, the polymer particles per se may range from about 1 to 100 microns in one non-limiting embodiment, and may range between about 0.3 and 10 microns or less, in another non-limiting embodiment may range from about 0.8 to less than 10 microns, where in another non-limiting embodiment, the particles have an average particle size between about 1 and 10 microns, and more preferably from about 1 to about 7 microns.

In other non-limiting embodiments, the drilling fluids and methods of use herein have an absence of an added paraffin wax; that is, no paraffin wax is added to the drilling fluid in formulating it. More specifically, there is an absence of a paraffin wax having a melting point between about 130° F. and about 175° F., and in particular an absence of from about 75 to about 90 weight percent of such an added paraffin wax. In another non-restrictive version, the drilling fluids and methods of use herein have an absence of a solubility retarding agent selected from the group consisting of long chain aliphatic hydrocarbons, aliphatic amides and oxidized hydrocarbon waxes melting at a temperature between about 250° F. and about 325° F. In particular, there is an absence of from about 1 to about 20 wt % of these solubility retarding agents. These paraffin waxes and solubility retarding agent are further described in U.S. Pat. No. 3,717,204, incorporated herein in its entirety by reference. Indeed, the present methods and compositions would not work using these materials, since these materials are designed to dissolve slowly, not quickly, as do the redispersible polymer particles described herein.

The invention will be further illustrated with respect to the following examples, which are only meant to further illuminate the invention, and not limit it in any way.

Example 1

Redispersible Polymer Powder in a Water-Based Drilling Fluid

As shown in FIG. 1, Copolymer A, a redispersible poly (ethylene-co-vinyl acetate) powder, may be dispersed into water to form colloid particles with an average diameter around 1 micron after mixing for 10 minutes by a Multimixer at 11,000 rpm (Model 9B with 9B29X impellers). FIG. 1 shows the redispersibility of the polymer powder herein. After shearing at 11000 rpm for 10 minutes, the particle size distribution is shifted to colloid particle range and the redispersible polymer powder forms stable dispersion again.

Example 2

Redispersible Powder Polymer Powder in an Oil-Based Drilling Fluid

Table I below shows the effect of Copolymer B, a redispersible poly(ethylene-co-vinyl versatate) powder, on the properties of a field oil-based fluid. After addition of 5 lb/bbl Copolymer B, it is seen that there is little effect on plastic viscosity (PV) and yield point (YP), but the high temperature, high pressure (HPHT) fluid loss at 250° F. (121° C.) on a 0.4 darcy cement disk is reduced to 9 ml from 15 ml for the base fluid without Copolymer B showing the effectiveness of the powder in providing a temporary, semi-permeable seal.

TABLE I

Effect on HPHT Fluid Loss of Redispersible Polymer Powder

| Component | Proportion without Polymer Powder | Proportion with Polymer Powder |
|---|---|---|
| 12 ppg (1.4 kg/l) Field Oil-based Mud | 350 ml | 350 ml |
| Copolymer B After mixing 20 minutes | — | 5 grams |
| Density, ppg (1.4 kg/l) | 12.1 ppg | 12.1 ppg |
| PV, cP (P-s) | 28 (0.028) | 28 (0.028) |
| YP, lb/100 ft² (N/m) | 15 (7.3) | 18 (8.8) |
| Gels, lb/100 ft² (N/m) | 13/24 | 14/26 |
| Electric Stability (ES), volts | 600 | 560 |
| HTHP, ml at 250° F. (121° C.) | 15 ml | 9 ml |

The methods and compositions herein have been shown to have potential to at least partially seal subterranean sand formations when conducting hydrocarbon recovery operations with oil-based or water-based drilling fluids. Further, drilling fluids that reduce the rate of drilling fluid pressure invasion into the borehole wall have also been provided herein. Alternatively, compositions and methods that increase the pressure blockage and reliability of sand formation seals may likely be accomplished with the water-based and oil-based fluids containing the polymer powder dispersions described herein.

In the foregoing specification, the invention has been described with reference to specific embodiments thereof, and has been described as effective in providing a water-based or oil-based drilling fluid that can effectively reduce the rate of drilling fluid pressure invasion of the borehole wall or partially or completely seal a subterranean sand formation. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines or hydrocarbon base fluids and redispersible polymer powders and with optional dispersants, emulsifiers, and/or wetting surfactants or salts falling within the claimed parameters, but not specifically identified or tried in a particular composition to reduce mud pressure penetration into shale or sand formations, are anticipated to be within the scope of this invention.

The words "comprising" and "comprises" as used throughout the claims are interpreted as "including but not limited to".

The present invention may suitably comprise, consist or consist essentially of the elements disclosed and may be practiced in the absence of an element not disclosed. In a non-limiting embodiment, the method of inhibiting fluid loss may consist of or consist essentially of providing a drilling fluid, circulating the drilling fluid in contact with a subterranean formation, and forming a deformable seal of redispersible polymer at least partially in contact with the subterranean formation, such as further described in the claims.

In another non-restrictive example, a suitable drilling fluid may consist of or consist essentially of a base fluid, a redispersible polymer powder and an absence of an added paraffin wax, such as further described in the claims.

GLOSSARY

MAX-SHIELD™ An aqueous suspension of sealing polymers available from Baker Hughes Drilling Fluids of Baker Hughes Incorporated.

What is claimed is:

1. A method of inhibiting fluid loss of a drilling fluid in a subterranean formation, the method comprising:
    a) providing a drilling fluid comprising:
        i) a base fluid selected from the group consisting of a hydrocarbon base fluid and an aqueous base fluid;
        ii) from about 0.1 to about 5 volume % based on the drilling fluid of a redispersible polymer powder dispersed in the fluid, where the powder is added by a technique selected from the group consisting of adding the redispersible polymer powder as part of a water dispersion and adding the redispersible polymer powder to the base fluid directly; and
        iii) the absence of an added paraffin wax;
    b) circulating the drilling fluid in contact with the subterranean formation; and
    c) forming a deformable seal of redispersible polymer at least partially in contact with the subterranean formation.

2. The method of claim 1 further comprising:
    d) redispersing the redispersible polymer of the deformable seal by contact with water.

3. The method of claim 1 where the polymer in the redispersible polymer powder dispersion is selected from the group consisting of poly(ethylene-vinyl acetate), poly(ethylene-vinyl tert-alkanoate), poly(ethylene-vinyl acetate-vinyl chloride), poly(styrene-butadiene), poly(carboxylated styrene-butadiene), poly(sulfonated styrene-butadiene), and combinations thereof.

4. The method of claim 1 where the redispersible polymer powder has a size between about 0.2 to less than 100 microns.

5. A method of inhibiting fluid loss of a drilling fluid in a subterranean formation, the method comprising:
   a) providing a drilling fluid comprising:
      i) a base fluid selected from the group consisting of a hydrocarbon base fluid and an aqueous base fluid;
      ii) a redispersible polymer powder dispersed in the fluid, where the powder is added by a technique selected from the group consisting of adding the redispersible polymer powder as part of a water dispersion and adding the redispersible polymer powder to the base fluid directly, and where the redispersible polymer powder is present in the drilling fluid in an amount of from about 0.1 to about 5 volume % based on the dispersion; and
      iii) the absence of an added paraffin wax;
   b) circulating the drilling fluid in contact with the subterranean formation;
   c) forming a deformable seal of the redispersible polymer at least partially in contact with the subterranean formation; and
   d) redispersing the redispersible polymer of the deformable seal by contact with water.

6. The method of claim 5 where the polymer in the redispersible polymer powder dispersion is selected from the group consisting of poly(ethylene-vinyl acetate), poly(ethylene-vinyl tert-alkanoate), poly(ethylene-vinyl acetate-vinyl chloride), poly(styrene-butadiene), poly(carboxylated styrene-butadiene), poly(sulfonated styrene-butadiene), and combinations thereof.

7. A drilling fluid comprising:
   a) a base fluid selected from the group consisting of a hydrocarbon base fluid and an aqueous base fluid;
   b) from about 0.1 to about 5 volume % based on the drilling fluid of a redispersible polymer powder dispersed in the fluid, where the powder is added by a technique selected from the group consisting of adding the redispersible polymer powder as part of a water dispersion and adding the redispersible polymer powder to the base fluid directly; and
   c) the absence of an added paraffin wax.

8. The drilling fluid of claim 7 where the polymer in the redispersible polymer powder dispersion is selected from the group consisting of poly(ethylene-vinyl acetate), poly(ethylene-vinyl tert-alkanoate), poly(ethylene-vinyl acetate-vinyl chloride), poly(styrene-butadiene), poly(carboxylated styrene-butadiene), poly(sulfonated styrene-butadiene), and combinations thereof.

9. The drilling fluid of claim 7 where the redispersible polymer powder has a size between about 0.2 to less than 100 microns.

10. A drilling fluid comprising:
    a) a base fluid selected from the group consisting of a hydrocarbon base fluid and an aqueous base fluid;
    b) from about 0.1 to about 5 volume % based on the drilling fluid of a redispersible polymer powder dispersed in the fluid, where the powder is added by a technique selected from the group consisting of adding the redispersible polymer powder as part of a water dispersion and adding the redispersible polymer powder to the base fluid directly, where the polymer powder is capable of providing a deformable seal on at least a portion of a subterranean formation; and
    c) the absence of an added paraffin wax.

11. The drilling fluid of claim 10 where the polymer in the redispersible polymer powder dispersion is selected from the group consisting of poly(ethylene-vinyl acetate), poly(ethylene-vinyl tert-alkanoate), poly(ethylene-vinyl acetate-vinyl chloride), poly(styrene-butadiene), poly(carboxylated styrene-butadiene), poly(sulfonated styrene-butadiene), and combinations thereof.

* * * * *